US006334578B1

(12) United States Patent
House

(10) Patent No.: US 6,334,578 B1
(45) Date of Patent: Jan. 1, 2002

(54) SPRAY HOOD ASSEMBLY

(76) Inventor: John L. House, P.O. Box 552, Oak Grove, LA (US) 71263

( * ) Notice: Subject to any disclaimer, the term of this patent is extended or adjusted under 35 U.S.C. 154(b) by 0 days.

(21) Appl. No.: 09/715,713

(22) Filed: Nov. 20, 2000

(51) Int. Cl.$^7$ ................................................ B05B 1/28
(52) U.S. Cl. ..................... 239/288.5; 239/77; 239/159; 239/167; 239/288; 47/1.7
(58) Field of Search ............................. 239/77, 78, 159, 239/161, 163, 167, 169, 172, 175, 104, 288, 288.3, 288.5; 47/1.7

(56) References Cited

U.S. PATENT DOCUMENTS

| 3,666,178 | A | * | 5/1972 | Crimmins et al. ...... 239/172 X |
| 4,274,589 | A | * | 6/1981 | Jones ......................... 239/167 |
| 4,646,971 | A | * | 3/1987 | Rogers ................. 239/288.5 X |
| 5,520,335 | A | | 5/1996 | Claussen ..................... 239/104 |
| 5,526,605 | A | | 6/1996 | O'Dougherty ................. 47/1.7 |
| D372,298 | S | | 7/1996 | Claussen ................... D23/227 |
| 5,655,712 | A | * | 8/1997 | Jones .................. 239/288.5 X |

OTHER PUBLICATIONS

Redball Catalog, 640 Three Point Broadcast Sprayers pp. 28–30.

* cited by examiner

*Primary Examiner*—Steven J. Ganey
(74) *Attorney, Agent, or Firm*—John M. Harrison

(57) ABSTRACT

A spray hood assembly for containing the spray mist of pesticides or other liquid agricultural chemicals in an application area as the pesticide or other liquid is applied to soil or vegetation. In a preferred embodiment, the spray hood assembly includes an elongated hood characterized by a selected number of arcuate hood segments attached to each other in end-to-end relationship and mounted on a trailer hitched to a tractor or other towing vehicle. As the suspended hood migrates over soil or vegetation, the pesticide or other liquid is sprayed into the hood. Air intake openings in the front of the hood segments permit entry of turbulent air which promotes mixing of the air and sprayed mist inside the hood and substantially uniform application of the mist to the soil or vegetation within the confines of the hood. In a preferred embodiment, a mist curtain extends downwardly from the curved front and rear panels of the adjacent hood segments for enhancing confinement of the mist in the hood during application.

12 Claims, 3 Drawing Sheets

SPRAY HOOD ASSEMBLY

BACKGROUND OF THE INVENTION

1. Field of the Invention

This invention relates to spray hoods or shields for confining the mist of sprayed agricultural chemicals such as pesticides in an application area as the pesticide or other liquid is applied to soil or vegetation. More particularly, the invention relates to a spray hood assembly which is typically mounted on a trailer hitched to a tractor for retarding drift of spray mist such as that of liquid pesticide or other liquid agricultural chemicals from the application area as the pesticide or chemical is sprayed on soil or vegetation through the migrating spray hood assembly. In a preferred embodiment, the spray hood assembly is characterized by an elongated hood assembled from multiple hood segments which typically have an arcuate cross-section and flanged ends for attaching a selected number of the hood segments to each other in end-to-end relationship. The assembled hood is mounted in a suspended configuration above the ground on a trailer coupled to a tractor or other towing vehicle. As the hood migrates over the soil or vegetation and the pesticide or other liquid chemical is sprayed into the hood, air openings in the hood segments permit entry into the hood of turbulent air which promotes mixing of the air and sprayed mist. This mixing action of the inflowing air facilitates uniform distribution of the liquid mist inside the hood and substantially uniform application of the mist to the soil or vegetation substantially within the confines of the hood. In a preferred embodiment, a mist curtain extends downwardly from the curved front and rear panels of the hood segments for enhancing confinement of the mist in the hood during application.

2. Description of the Prior Art

Various types of migrating spray shield assemblies are known in the art for transiently enclosing the spray mist of liquid herbicides or other agricultural liquids as the liquids are sprayed on vegetation. Typical of these is the "Spray Hood and Assembly Including the Spray Hood", described in U.S. Pat. No. 5,520,335, dated May 28, 1996, to Claussen, et al. The spray hood assembly is adapted for spraying liquids on the ground while limiting drifting of the sprayed liquid mist. The assembly has a wheeled trailer adapted to be coupled to a towing vehicle which transports the trailer along the ground, the rear end of the trailer fitted with a pair of elongated, horizontal, oppositely-extending hood support members. Multiple hoods each having diverging front and rear walls projecting from opposite sides of a top wall are mounted on each hood support member. A liquid distribution system including spray nozzles is provided in the hoods for directing liquid spray on the ground, whereupon the top and side walls of the respective hoods limit drifting of the sprayed liquid mist. U.S. Pat. No. 5,526,605, dated Jun. 18, 1996, to O'Dougherty, describes a "Spray Shield" adapted to be connected to a support frame which carries the shield over vegetation. The spray shield assembly includes a polymeric spray shield having a top wall portion suspended from the support frame, and side wall portions extend downwardly from the top wall portion to form a channel which extends through the shield. Stiff, polymeric slotted end closure sheets are attached across the open front and rear ends of the channel to retain the spray therein. Spaced weed knock-down bars extend between the opposite side wall portions adjacent to the open side of the channel, and are adaptable for spacing the side wall portions at various distances from each other Des. U.S. Pat. No. 372,298, dated Jul. 30, 1996, to Claussen, et al., discloses a "Spray Hood" characterized by a flat top having front and rear panels extending downwardly therefrom in angular relationship.

An object of this invention is to provide a new and improved spray hood assembly for confining the spray mist of agricultural liquid chemicals such as pesticides as the liquid is applied to soil or vegetation, which spray hood assembly promotes mixing of the sprayed mist with turbulent air to facilitate substantially uniform application of the mist to the soil or vegetation.

Another object of this invention is to provide a new and improved spray hood assembly which can be attached to a conventional trailer coupled to a tractor or other towing vehicle.

Still another object of the invention is to provide a spray hood assembly characterized by an elongated hood mounted on a suitable trailer coupled to a tractor or other towing vehicle, the front of which hood is provided with air intake openings through which turbulent air can enter the hood and mix with pesticide or other agricultural liquid sprayed into the hood to promote uniform distribution of the liquid mist in the hood and facilitate substantially uniform application of the mist to soil or vegetation within the confines of the hood.

Yet another object of this invention is to provide a spray hood assembly for retarding drifting of liquid pesticide or other agricultural liquid mist from a mist application area as the pesticide or other liquid is sprayed on soil or vegetation, which spray hood assembly is characterized by a hood of selected length having a selected number of hood segments joined together in end-to-end relationship, each hood segment typically having a substantially arcuate cross-sectional configuration and including curved front and rear panels extending downwardly from a hood top; and multiple air intake openings provided in the front panel of each hood segment, wherein turbulent air enters the hood through the air intake openings and mixes with liquid pesticide or other agricultural chemicals sprayed into the hood to promote substantially uniform distribution of the spray mist in the hood and application of the mist to the soil or vegetation within the confines of the hood as the hood migrates over the soil or vegetation.

SUMMARY OF THE INVENTION

These and other objects of the invention are provided in a new and improved spray hood assembly for retarding the drift of liquid pesticide spray mist or the mist of other agricultural liquid chemicals from the pesticide or chemical application area as the pesticide or other liquid is sprayed on soil or vegetation. In a preferred embodiment, the spray hood assembly is characterized by an elongated hood of selected and variable length including multiple hood segments each typically having a substantially arcuate cross-sectional configuration and fitted with flanged ends for typically bolting a selected number of the hood segments to each other in end-to-end relationship. The assembled hood is mounted on a suitable trailer coupled to a tractor or other towing vehicle. As the hood migrates over the soil or vegetation by operation of the tractor or other vehicle, the pesticide or other liquid is sprayed into the hood. Air openings in the curved front panels of the hood segments permit entry of turbulent air which mixes with the sprayed liquid mist inside the hood to facilitate substantially uniform application of the mist to the soil or vegetation beneath the hood. In a preferred embodiment, a mist curtain extends downwardly from each curved front and rear panel of the adjacent hood segments for enhancing confinement of the mist in the hood during application.

BRIEF DESCRIPTION OF THE DRAWINGS

The invention will be better understood by reference to the accompanying drawings, wherein:

FIG. 1 is a perspective view of a preferred embodiment of the spray hood assembly of this invention;

FIG. 2 is a perspective view of a hood segment component of the spray hood assembly;

FIG. 3 is an exploded, perspective view of the spray hood assembly illustrated in FIG. 1;

FIG. 4 is an exploded, perspective view of the hood segment illustrated in FIG. 2; and FIG. 5 is a sectional view, taken along section lines 5—5 in FIG. 2, of the spray hood assembly, more particularly illustrating application of a liquid pesticide to vegetation in typical operation of the spray hood assembly.

DESCRIPTION OF THE PREFERRED EMBODIMENTS

Referring initially to FIGS. 1–4 of the drawings, in a preferred embodiment the spray hood assembly of this invention is generally illustrated by reference numeral 1. The spray hood assembly 1 is characterized by an elongated hood 14 which as hereinafter described is typically assembled from a selected number of hood segments 3, each typically having an arcuate cross-sectional configuration. Each hood segment 3 is typically molded of a stiff, flexible polymeric material such as polypropylene or polyethylene, in non-exclusive particular, and, as illustrated in FIGS. 2 and 4, includes a flat hood top 4, has a curved front panel 5 and an oppositely-disposed, curved rear panel 6 extending downwardly from opposite edges of the hood top 4. Multiple, spaced-apart stiffening ribs 7 are typically shaped in the front panel 5 and rear panel 6 of each hood segment 3. A pair of typically elongated, spaced-apart air intake openings 9 each extends through the front panel 5, and an air guide flap 10 typically protrudes forwardly from the front panel 5 above the corresponding air intake opening 9, the purpose of which air intake openings 9 and air guide flaps 10 will be hereinafter described. A mist curtain 12, typically characterized by multiple, flexible plastic strips 12*a*, extends downwardly from an elongated curtain support 11 which is typically mounted by means of bolts 11*a* (FIG. 5) on the front panel 5 and rear panel 6, respectively, of each hood segment 3, adjacent to the bottom edge 5*a* thereof as illustrated in FIG. 4.

As further illustrated in FIGS. 2 and 4, a segment attachment flange 8, provided with multiple, spaced-apart attachment bolt openings 8*a*, is typically provided on each end of each hood segment 3. Accordingly, a selected number of the hood segments 3 can be attached to each other in end-to-end relationship to assemble a hood 14 of desired length, as illustrated in FIG. 3, by mating the segment attachment flanges 8 on the ends of adjacent hood segments 3; extending flange bolts (not illustrated) through registering bolt openings 8*a* in the respective segment attachment flanges 8; and threading nuts (not illustrated) on the respective flange bolts. A crescent-shaped end plate 13, fitted with multiple bolt openings 13*a*, is typically removably secured on each end of the assembled hood 14, on the exposed segment attachment flange 8 of each terminal hood segment 3 by means of mount bolts 13*b* and securing nuts 13*c* to substantially close the hood interior 14*a* (FIG. 1) of the assembled hood 14. It will be appreciated by those skilled in the art that the hood 14 can be disassembled or shortened in length, as desired, by removing the flange bolts (not illustrated) from the registering bolt openings 8*a* of the mating segment attachment flanges 8 and removing the terminal hood segment or segments 3 from the hood 14.

As illustrated in FIG. 4, one end of an elongated hood mount bracket 16 is secured to the flat hood top 4 of each hood segment 3, adjacent to each end thereof typically by means of a pair of bracket mount bolts 17, extended through respective bolt openings 16*a* provided in the hood mount bracket 16 and through registering bolt openings 4*a* provided in the hood top 4 and secured by nuts 17*a*. An additional pair of bolt openings 16*a* is typically provided in the hood mount bracket 16 adjacent to the extending end thereof for receiving an inverted U-bolt 18 and mounting the assembled hood 14 on an elongated tool bar 2, as illustrated in FIG. 3 and hereinafter further described.

Referring again to FIGS. 1 and 3 and to FIG. 5 of the drawings, in typical application of the spray hood assembly 1, a hood 14 of selected length is initially assembled typically by bolting a selected number of the hood segments 3 to each other in end-to-end relationship at the terminal segment attachment flanges 8, as heretofore described. The assembled hood 14 is mounted on the tool bar 2 (illustrated in phantom in FIG. 1), provided on a trailer (not illustrated) such as that detailed in U.S. Pat. No. 5,520,335, and the trailer is coupled to a tractor or other towing vehicle (not illustrated). As described in that patent, two of the tool bars 2 typically extend from opposite sides of a central frame (not illustrated) which is mounted on the rear end of the trailer. An assembled hood 14 of the spray hood assembly 1 of this invention is mounted on each tool bar 2 as hereinafter described, with each hood 14 suspended above the vegetation 25 and soil 26 as illustrated in FIG. 5. The inverted U-bolts 18 receive the tool bar 2 and are extended through the pair of adjacent bolt openings 16*a* provided in each corresponding hood mount bracket 16, as illustrated in FIG. 3, and the threaded parallel legs of the U-bolt 18 each receives a securing nut (not illustrated). A feed tube 20 (illustrated in phantom), connected to a conventional liquid pump and supply mechanism (not illustrated) typically mounted on the trailer, is typically mounted on each tool bar 2. Multiple spray tubes 21 extend from the feed tube 20, and, as illustrated in FIG. 5, each spray tube 21 is fitted with a spray nozzle 22 which extends through a tube opening (not illustrated) provided in the hood top 4 of each hood segment 3 and terminates in the hood interior 14*a* of the hood 14. It is understood that a variety of configurations are possible for the feed tube 20 and spray tubes 21 on the hood 14, which feed tube 20 and spray tubes 21 shown in FIGS. 1 and 3 serve only as an example of a suitable liquid application system for the spray hood assembly 1. As the tractor (not illustrated) or other towing vehicle is operated to slowly draw the suspended hood 14 forwardly over the vegetation 25 and soil 26 in the direction indicated by the arrow 28 in FIG. 5, the conventional pump mechanism (not illustrated) of the pesticide 24 or other agricultural liquid on the trailer is operated to pump the pesticide 24 or liquid from the typically trailer-mounted liquid container (not illustrated) through the feed tube 20, spray tubes 21 and respective spray nozzles 22, where the pesticide 24 is sprayed into the hood interior 14*a*. Because of the forward motion of the hood 14 over the vegetation 25 and soil 26, air outside the hood 14, aided by the air guide flaps 10, is drawn through each air intake opening 9 in the front panel 5 of each hood segment 3 as indicated by the arrows 9*a* in FIG. 5, and the incoming turbulent air thoroughly mixes with the mist of the sprayed pesticide 24 or other liquid from the spray nozzles 22, inside the hood interior 14*a*. This mixing action of the turbulent air and pesticide mist 24 promotes substantially uniform distribution of the pesticide mist 24 throughout the hood interior 14*a*, and the pesticide mist 24 is substantially uniformly applied to the vegetation 25 beneath the hood 14. The front panel 5, rear panel 6, mist curtains 12 and terminal end plates 13 (FIG. 1) of the joined hood segments 3 maintain the sprayed pesticide mist 24 substantially within the confines of the hood interior 14a, and prevent the pesticide mist 24 from excessively drifting from the hood interior 14a. Accordingly, the pesticide 24 or other agricultural chemical liquid mist is thoroughly and uniformly applied to the vegetation 25 as the hood 14 passes over the vegetation 25.

Figures 1, 2:
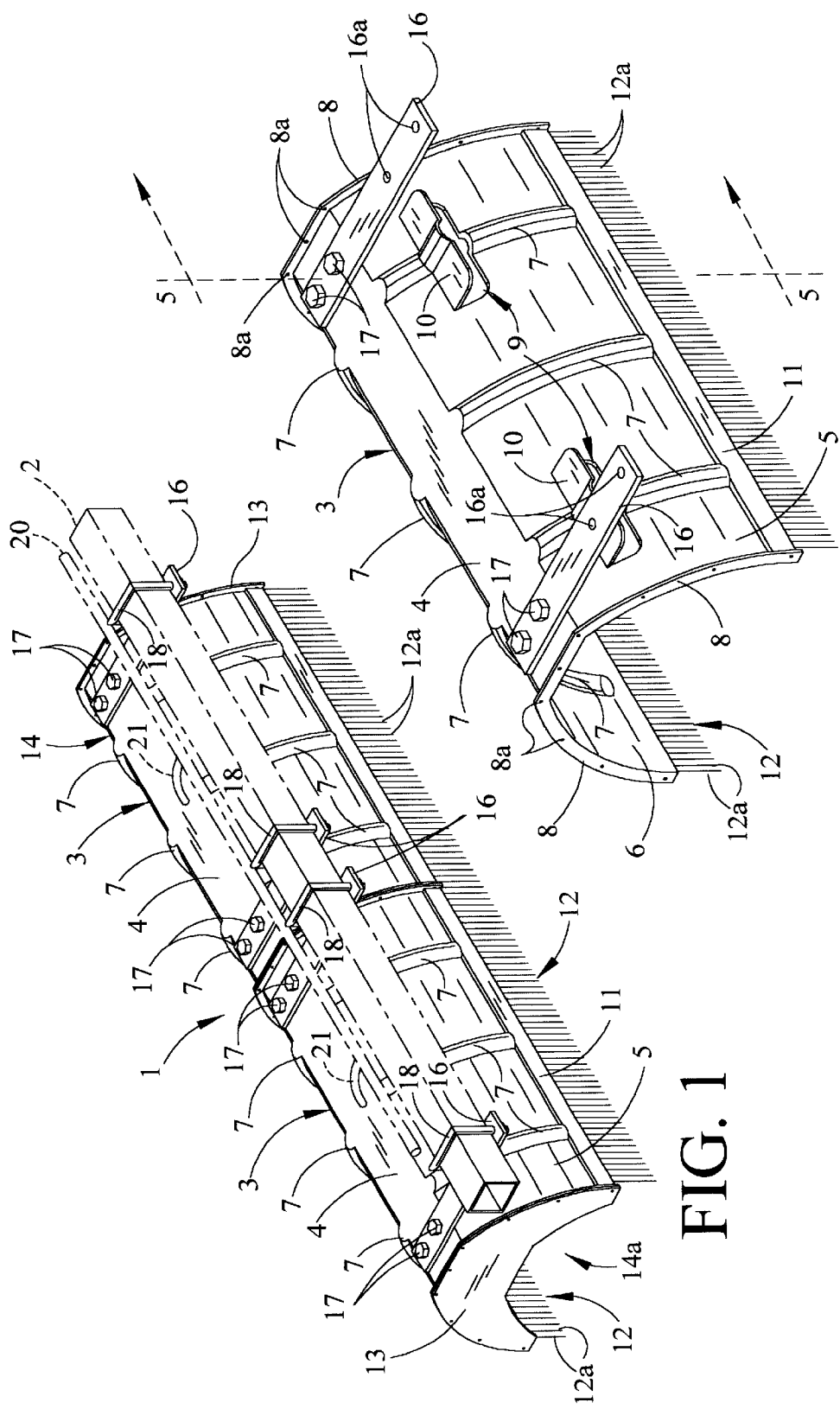
Figure 3:
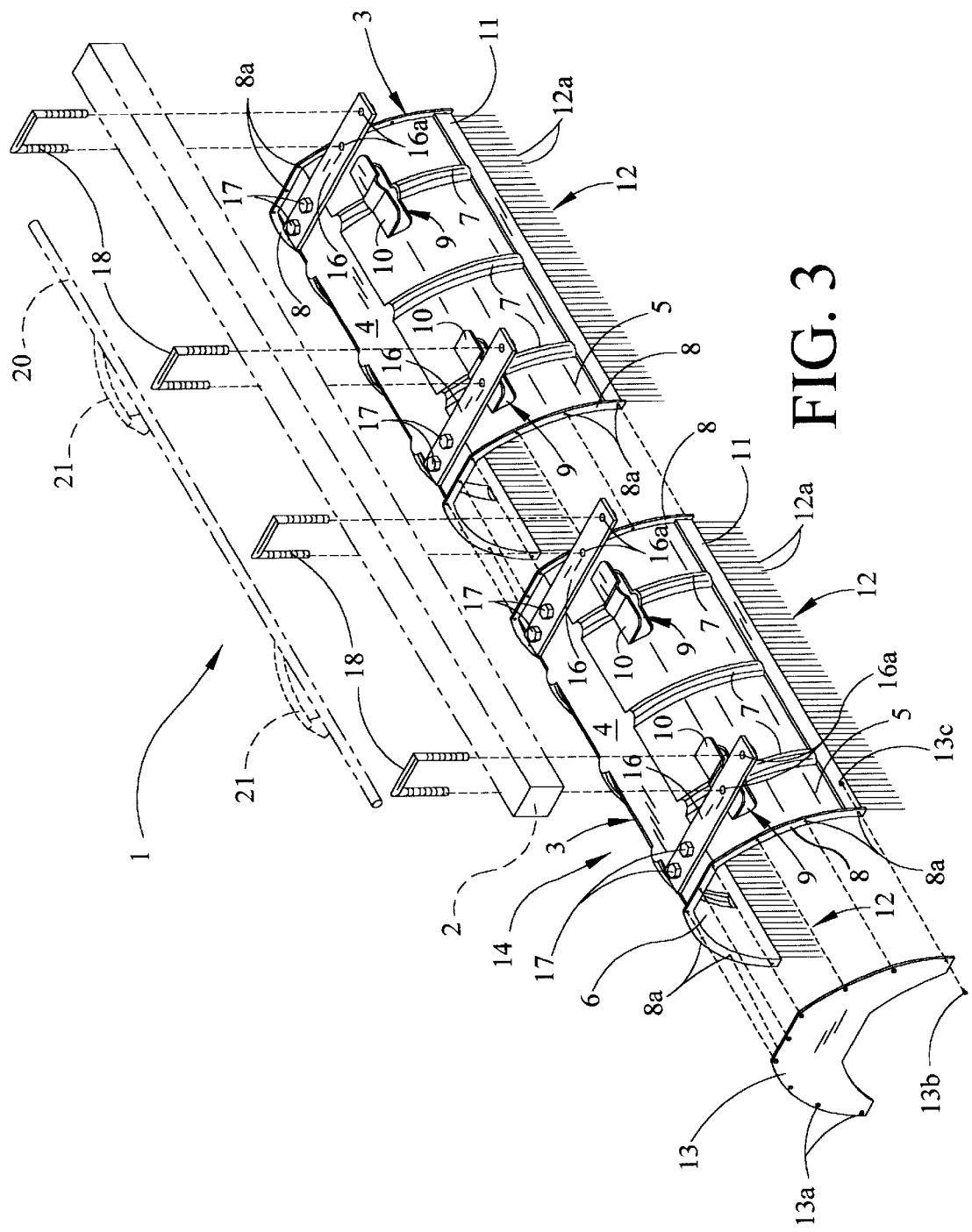
Figure 4:
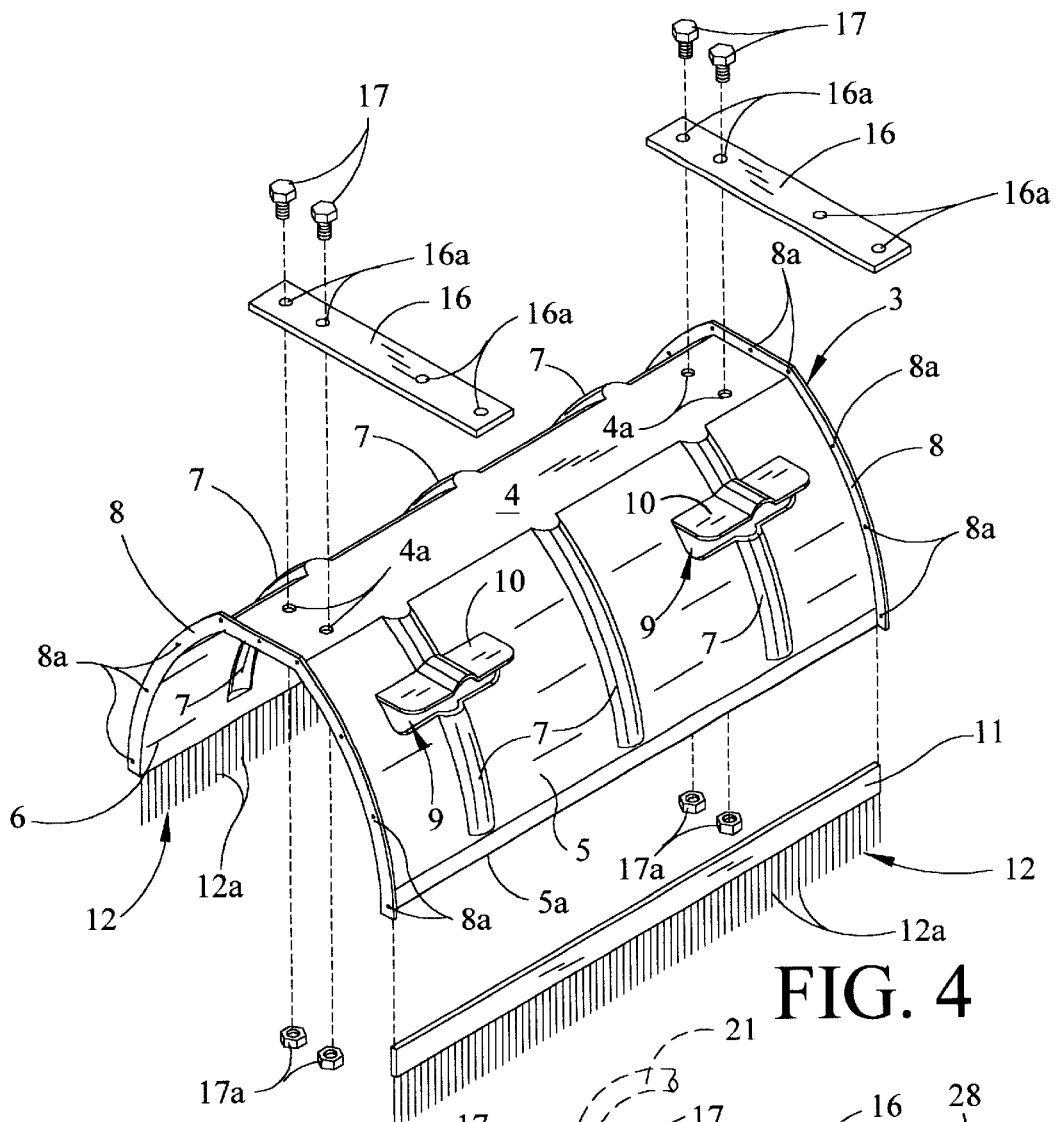
Figure 5:
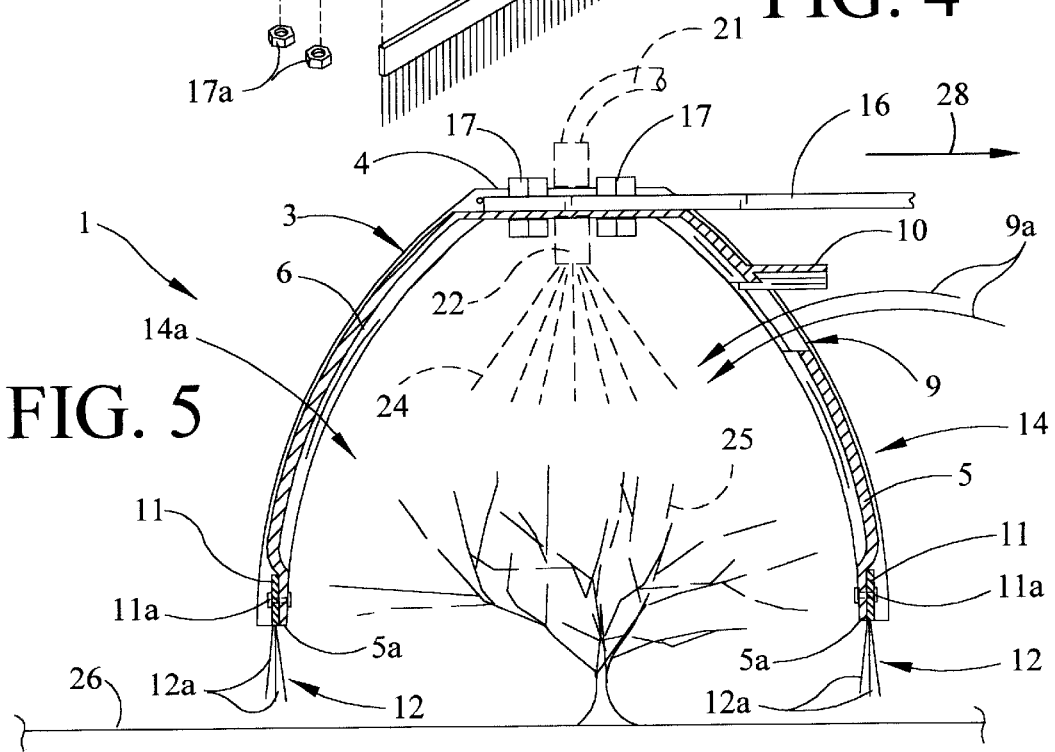

It will be appreciated by those skilled in the art that the spray hood assembly of this invention is capable of facilitating uniform distribution of herbicides, pesticides, fertilizers and other liquid agricultural chemicals on vegetation or soil by mixing turbulent air with the sprayed liquid mist inside the migrating hood. The turbulent air spreads the sprayed mist inside the confines of the hood, thereby providing a substantially uniform spread of the mist throughout the hood and distribution of the mist droplets on the vegetation or soil beneath the hood. It is understood that while the hood component of the spray hood assembly can be constructed in one piece and in selected lengths, the hood is preferably assembled from multiple hood segments of selected length to facilitate constructing a hood having a length which is optimum for the desired application. It will be further appreciated by those skilled in the art that while the spray hood assembly can be suitably adapted for mounting on any type of trailer which can be coupled to a tractor or other towing vehicle for transport of the hood over soil or vegetation, the spray hood assembly of this invention is particularly adapted for mounting on a trailer of the type disclosed in U.S. Pat. No. 5,520,335, as heretofore described and according to the knowledge of those skilled in the art. It is understood that a blower such as a "squirrel cage" fan blower which is well-known to those skilled in the art can be fitted in each air intake opening of the hood segments, as desired, to facilitate blowing turbulent air in the hood interior and thorough mixing of the air with the sprayed liquid mist for uniform application of the mist to the soil or vegetation.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A spray hood assembly for attachment to a towing vehicle and containing a mist of an agricultural liquid as the liquid is sprayed on vegetation, said spray hood assembly comprising a hood for engaging the vehicle and suspension above the vegetation, wherein the liquid is sprayed in said hood; at least one air intake opening provided in said hood for facilitating entry of air into said hood and promoting substantially uniform distribution of the liquid mist inside said hood and substantially uniform application of the mist to the vegetation as said hood migrates over the vegetation; and an air guide flap provided on said hood above said at least one air intake opening, respectively, for guiding air into said at least one air intake opening, respectively.

2. The spray hood assembly of claim 1 wherein said hood comprises a plurality of hood segments attached to each other in end-to-end relationship and wherein said air guide flap and said at least one air intake opening are provided on and in each of said plurality of hood segments.

3. The spray hood assembly of claim 2 comprising a segment attachment flange provided on each end of said plurality of hood segments, respectively, for attaching said plurality of hood segments, respectively, in end-to-end relationship to each other.

4. The spray hood assembly of claim 3 wherein said at least one air intake opening comprises a plurality of air intake openings.

5. The spray hood assembly of claim 1 wherein said at least one air intake opening comprises a plurality of air intake openings.

6. The spray hood assembly of claim 5 wherein said hood comprises a plurality of hood segments attached to each other in end-to-end relationship and wherein said air guide flap and at least one of said plurality of air intake openings are provided on and in each of said plurality of hood segments.

7. A spray hood assembly for attachment to a towing vehicle and containing a mist of an agricultural liquid as the liquid is sprayed on vegetation, said spray hood assembly comprising a hood for engaging the vehicle and suspension above the vegetation, wherein the liquid is sprayed in said hood, said hood having a substantially arcuate cross-sectional configuration and including a hood top, a curved rear extension extending downwardly from said hood top and a curved front extension extending downwardly from said hood top opposite said rear extension; at least one air intake opening provided in said front extension for facilitating entry of air into said hood and promoting substantially uniform distribution of the liquid mist inside said hood and substantially uniform application of the mist to the vegetation; and an air guide flap provided on said hood above said at least one air intake opening, respectively, for guiding air into said at least one air intake opening, respectively.

8. The spray hood assembly of claim 7 wherein said hood comprises a plurality of hood segments attached to each other in end-to-end relationship and wherein said air guide flap and said at least one air intake opening are provided on and in each of said plurality of hood segments.

9. The spray hood assembly of claim 7 wherein said at least one air intake opening comprises a plurality of air intake openings.

10. The spray hood assembly of claim 9 wherein said hood comprises a plurality of hood segments attached to each other in end-to-end relationship and wherein said air guide flap and at least one of said plurality of air intake openings are provided on and in each of said plurality of hood segments.

11. A spray hood assembly for attachment to a towing vehicle and containing a mist of an agricultural liquid as the liquid is sprayed on vegetation, said spray hood assembly comprising a hood for engaging the vehicle and suspension above the vegetation and receiving the liquid mist; a plurality of air intake openings provided in said hood for facilitating entry of air into said hood and promoting substantially uniform distribution of the liquid mist inside said hood and substantially uniform application of the mist to the vegetation; an air guide flap provided on said hood above each of said plurality of air intake openings, respectively, for guiding air into said plurality of air intake openings, respectively; and a mist curtain extending downwardly from said hood for containing the mist inside said hood.

12. The spray hood assembly of claim 11 wherein said hood comprises a plurality of hood segments attached to each other in end-to-end relationship to each other and wherein said air guide flap and comprises at least one of said plurality of air intake openings are provided on and in each of said plurality of hood segments.

* * * * *